United States Patent [19]

Säger et al.

[11] Patent Number: 6,070,120
[45] Date of Patent: May 30, 2000

[54] METHOD AND SYSTEM FOR THE DETERMINATION IN ADVANCE OF A TRAVEL CORRIDOR OF A MOTOR VEHICLE

[75] Inventors: Peter Säger, Friedrichsdorf; Thomas Landsiedel, Steinbach, both of Germany

[73] Assignee: Mannesmann VDO AG, Frankfurt, Germany

[21] Appl. No.: 08/988,859

[22] Filed: Dec. 11, 1997

[30] Foreign Application Priority Data

Dec. 20, 1996 [DE] Germany .......................... 196 53 258
Dec. 7, 1997 [DE] Germany .......................... 197 49 306

[51] Int. Cl.[7] .................................................. G06F 7/00
[52] U.S. Cl. ........................... 701/96; 701/69; 701/74; 303/146; 303/147; 180/197
[58] Field of Search .................................. 701/23, 69, 72, 701/74, 75, 96, 205, 207, 66; 303/146, 147; 180/197, 248

[56] References Cited

U.S. PATENT DOCUMENTS

| | | |
|---|---|---|
| 5,231,597 | 7/1993 | Komatsu . |
| 5,343,206 | 8/1994 | Ansaldi et al. ............................ 342/70 |
| 5,455,770 | 10/1995 | Hadeler et al. ............................ 701/70 |
| 5,631,829 | 5/1997 | Takasaki et al. .......................... 701/36 |
| 5,648,905 | 7/1997 | Izumi et al. ............................... 701/93 |
| 5,734,595 | 3/1998 | Matsuno ..................................... 701/86 |
| 5,752,062 | 5/1998 | Gover et al. ............................. 355/800 |
| 5,826,209 | 10/1998 | Matsuno .................................... 701/69 |

*Primary Examiner*—William A. Cuchlinski, Jr.
*Assistant Examiner*—Gertrude Arthur
*Attorney, Agent, or Firm*—Martin A. Farber

[57] ABSTRACT

A method and system for the determining in advance of the travel corridor of a motor vehicle for an automatic system for establishing a safe tailing distance in which a signal corresponding to the speed is used to determine a turning radius of the motor vehicle, the travel corridor being determined from the turning radius.

For the exact determination of the travel corridor of the motor vehicle, and in order sufficiently to take into consideration the travel dynamics of the motor vehicle, the speed of at least two wheels of the vehicle are measured and the yawing of the vehicle determined from the difference between the two wheel speeds.

12 Claims, 3 Drawing Sheets

METHOD AND SYSTEM FOR THE DETERMINATION IN ADVANCE OF A TRAVEL CORRIDOR OF A MOTOR VEHICLE

FIELD AND BACKGROUND OF THE INVENTION

The present invention relates to a method for the determination in advance of the travel corridor of a motor vehicle, and to an automatic system for establishing a safe tailing distance, wherein a signal corresponding to the speed is used in order to determine a turning radius of the motor vehicle, the travel corridor being determined from the turning radius, the invention relating also to a system for carrying out the method.

In automatic speed and tailing distance control systems for determining a traffic situation, it is customary to determine a travel corridor in advance by means of signals from yawing sensors and transverse-acceleration sensors. In other words, there is determined the place where the vehicle will stop after a predetermined period of time and what vehicles in front of it will stop in the travel corridor of one's own vehicle.

The travel corridor is determined in this connection from the turning radius of the motor vehicle, which, in its turn, is derived from the speed of the vehicle and signal from the yawing sensors.

The use of the yawing sensors, however, does not at present provide sufficient information concerning the travel dynamics of the motor vehicle. They must be detected by additional sensors.

SUMMARY OF THE INVENTION

The object of the invention is thus to indicate a method for the precise determination of the travel corridor of the motor vehicle which takes the travel dynamics of the motor vehicle into sufficient account.

In accordance with the invention, the speed of at least two wheels of the vehicle, preferably of one axle, are measured and the yaw of the vehicle is determined from the difference between the speed of the two wheels.

The advantage of the invention is that, by the measurement of the speed of the wheels, the actual difference in the speed of the two wheels of the vehicle enters into the determination of the travel corridor. The corridor can thus be determined very accurately, since the travel dynamics is in this way taken directly into account.

A signal corresponding to the wheel speed is advantageously produced by scanning discontinuities which are present on the circumference of the wheel of the vehicle.

This procedure permits a precise determination of the speed of the wheel since manufacturing tolerances of the increment disk and out-of-true places of tires and rims do not enter as disturbances into it and thus the travel corridor of the motor vehicle can be dependably determined.

In one embodiment, upon the detection of each discontinuity, an electric pulse is produced and the pulses counted, and a period of time determined within which the pulses of all discontinuities of the rotating part are counted precisely once, and the speed of the wheel determined from this.

In this way, the wheel speed is advantageously determined from the time required for a complete revolution of the wheel.

Despite the elimination of the manufacturing tolerances and out-of-true places of the wheel, a sufficiently dynamic signal is thus obtained, which assures a reliable determination of the travel corridor based on the wheel speed actually measured.

In one embodiment, the pulses representing the discontinuities are divided into groups and, upon the occurrence of the first pulse of each group, a new time measurement is commenced by counting the pulses over all discontinuities. In this connection, the pulses which represent the discontinuities are combined in groups of the same number.

Particularly in the case of low speeds, this permits a faster recognition of the speed of the wheel. Furthermore, changes in the speed are in this way detected faster and more reliably.

In a further development, after the occurrence of the pulse of the first discontinuity of each group, time information is stored, after the repeated occurrence of the pulse of this first discontinuity of each group, a second time information is determined which is compared with the first time information and the difference between the two is used to determine the wheel speed. In this connection, upon the occurrence of the second time information, the first time information is erased and the second time information is stored.

In this way, only the time information of interest at the moment is stored and thus there is only slight need for memory capacity.

In system for carrying out the method, an increment transmitter is associated with at least every two wheels of the motor vehicle, opposite which transmitters there is a signal sensor which detects the signal corresponding to the speed of the wheel. This sensor is connected with a control unit which determines the travel corridor of the motor vehicle, and the control unit has a memory with several registers, which memory can be controlled by the signal from a counter.

In this connection, the registers accept the content of a timer acting as counter. The timer is preferably the time clock contained in the microprocessor.

On each vehicle wheel there is arranged an increment transmitter opposite which there is, in each case, a sensor which is connected to the control unit, and the control unit determines from all the signals the travel corridor for a predetermined time.

The determination of the speed on each wheel of the motor vehicle is particularly important for the determination in advance of travel around curves.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
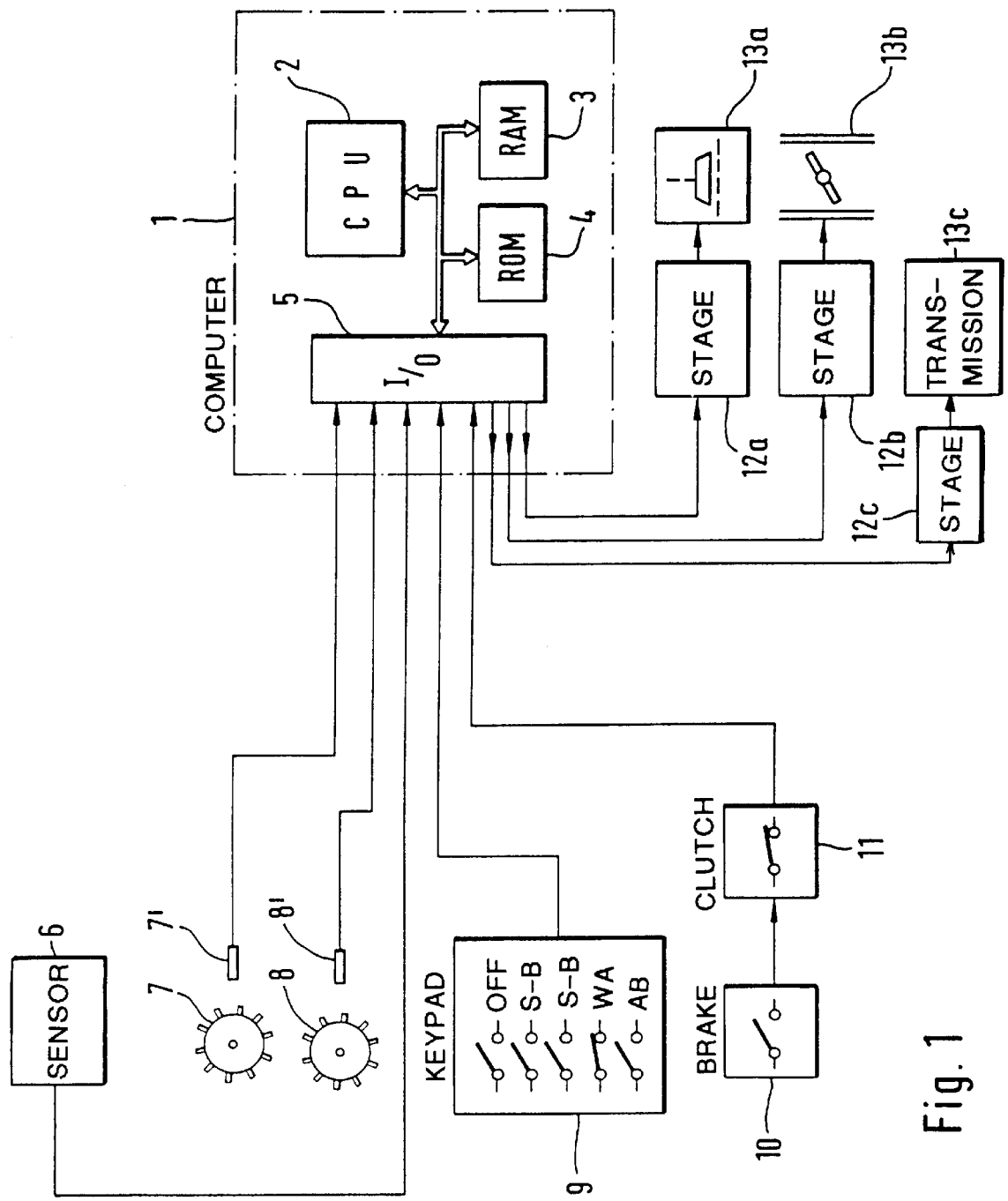
FIG. 1 shows a first embodiment of the invention for determining the travel corridor by means of the wheel speed.

FIG. 1 shows an automatic speed and tailing distance control system for maintaining a safe distance of vehicles from one another, this system being arranged on the bumper of the car. A powerful microcomputer 1, comprising a central processing unit 2, a random-access memory 3, a read-only memory 4, and an input/output unit 5, receives from a radar or laser sensor 6 a signal which measures the information concerning the distance from at least one vehicle in front of it.

Increment disks 7 and 8 are arranged on the two front wheels (not shown) of the motor vehicle and are scanned with respect to the speed of rotation by wheel sensors 7', 8' which are arranged opposite the increment disks 7 and 8. These speed signals are also fed via an input and output unit 5 to the microcomputer 1. The wheel sensors may be inductive transmitters or Hall sensors.

From the signals delivered by the laser sensor 6 (tailing-distance signal and relative-speed signal) and by means of the wheel speeds, the microprocessor 1 calculates the difference in speed between two vehicles and from this determines the safe minimum tailing distance. If this distance falls below the safe minimum tailing distance, the signal warns the driver when the warning function is activated.

If the tailing-distance operation is turned on by the driver, then the distance from the car in front is automatically set at a selectable distance. By the depressing of a key on the control panel 9, a desired speed and/or the desired tailing distance is set and stored, and is maintained by the system.

Upon approaching a slower vehicle, the microcomputer 1, by automatically closing the throttle valve 13b, effects a decrease in the speed of the vehicle and in this way adjusts the desired distance from the preceding car which was set, in which connection the desired distance is always greater than or equal to the safe distance prescribed by law. In addition to the automatic closing of the throttle valve 13b, action on the brake 13a and/or control of the automatic transmission 13c is possible so as to reduce the speed of travel. When the road ahead is again free, the tailing-distance controller accelerates the vehicle to the maximum speed set. The distance control is always active upon the passing of a car.

Furthermore, the microcomputer 1 is connected with switches 10 of the vehicle brake and/or switches 11 the vehicle clutch. If the switches are actuated by the driver via the clutch pedal or the brake pedal, they disconnect the control in normal operation.

In the microcomputer 1, a closed-loop circuit forms a comparison between a desired value and the actual value of a control concept contained in software. If one is within the control range, then an output signal determined by the control item is given off by the microcomputer 1. The throttle valve 13b, the brake 13a, and/or the transmission 13c are controlled via respective electric output stages 12a, 12b, and 12c.

From the speed signals detected by the speed sensors 7', 8', the means formed in the microcomputer 1 for determining the tread determines the yaw rate $\phi$ of the vehicle. The yaw rate is determined as follows:

$$\phi = \Delta V_{FW}/(S+V^2 \times k)$$

wherein $\Delta V_{FW}$ is the difference in speed between the front wheels of the vehicle, S is the width of the tread between the front wheels, V is the speed of travel, k is the dynamic correction factor.

With the aid of the yaw determined in this way, the track of the vehicle is now calculated from the curve radius $R = V_W/\phi$.

The radius moved over by each front wheel is determined from the wheel speed $V_W$ of this front wheel divided by the yaw $\phi$.

The travel corridor is formed as a function of the radii $R_R$ and $R_L$ of the right and left front wheels. The width of the travel corridor is equal to at least the tread of the wheels.

The determination of the wheel speed will now be explained:

The increment disks 7 and 8 which are connected to the respective front wheels of the motor vehicle have, for instance, an even number of discontinuities. Upon the rotation of the increment disk 7 or 8, the discontinuities move past the Hall sensor 7' or 8' respectively at a predetermined distance from it in such a manner that the magnetic flux between the disk 7 or 8 and the respective sensor 7' or 8' is changed. The output signal of each Hall sensor 7' or 8' is a series of pulses, in which connection the front flanks or rear flanks of the pulses are counted. The discontinuities of the increment disks 7 and 8 form groups, each group having the same number of discontinuities.

In the event, for instance, of 50 discontinuities n, each group i has, for instance, five discontinuities.

A timer, preferably the piezoelectric quartz contained in the microcomputer 1 supplies an actual time signal.

By means of the pulses n produced by the wheel sensor 7', 8' as a function of the discontinuities, the actual time signals are entered into the random-access memory 3 as a function of the front flank of the corresponding pulse. The random-access memory 3 of the microcomputer 1 has as many register places as groups of discontinuities which have been selected.

In order to be able better to utilize the storage capacity of the random-access memory 3, the frequency of the piezoelectric quartz can be reduced.

Figure 2:
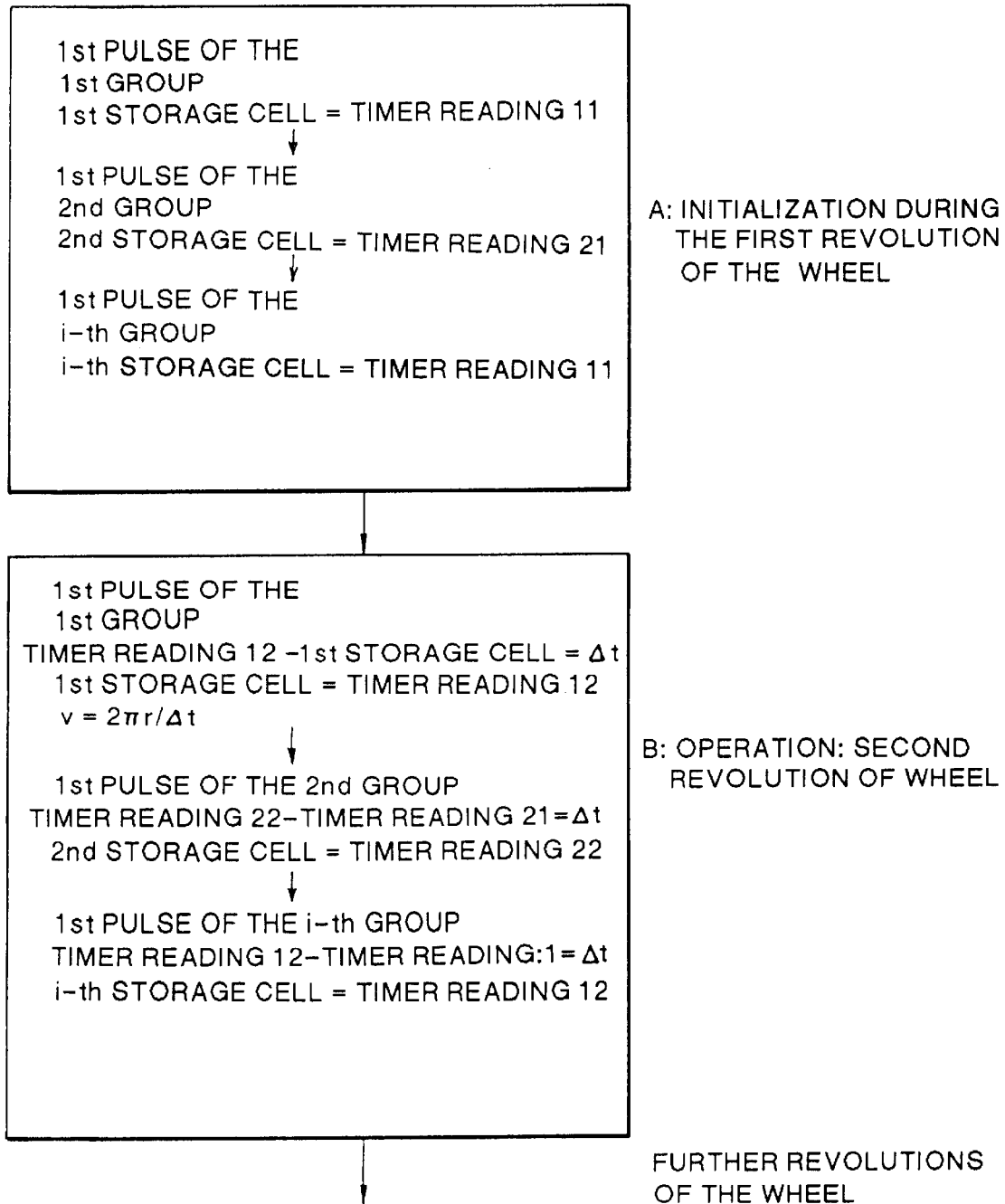
FIG. 2 is an algorithm for the determining of the wheel speed.

The method of the invention for determining the wheel speed will be now explained with reference to FIG. 2:

In an initialization phase, which takes place during the first revolution of the wheel, the actual reading of the timer is entered, after occurrence of the first pulse of the first group of discontinuities, into the first register of the memory 4 of the microprocessor. Upon the occurrence of the first pulse of the second group of discontinuities, the actual time reading at this time is stored in the second register of the memory 4.

This takes place in analogous manner for each first pulse of the corresponding group. Upon the first pulse of the i-th group, the actual timer reading i is stored in the i-th register of the memory 4. The initialization is concluded after one revolution of the wheel.

During the normal operating condition, which follows the first revolution of the wheel, the speed of the wheel is determined as follows.

Upon the occurrence of the pulse of the first group of discontinuities, during the second revolution of the wheel at this time. the stored timer reading 11 is deducted from the actual timer reading 12 at this time and the wheel speed v is determined by means of this difference $\Delta t$, $$v = 2\pi r/\Delta t,$$

r being the radius of the wheel.

The timer reading 11 is erased and the actual timer reading 12 is entered into the first register of the memory.

Upon the application of the first pulse of the second group of discontinuities, the stored timer reading 21 is deducted from the actual timer reading 22 and the instantaneous speed of the wheel is determined, as described, with the aid of this difference. The timer reading 21 is written over by the timer reading 22.

This takes place for each first pulse of each first group of discontinuities until the second revolution of the wheel has been completed.

The method described is repeated upon each revolution of the wheels, the timer reading stored from the preceding revolution of the wheel being removed by the time reading of each group actually present. The formation of the difference described now takes place every five pulses by comparison of the timer reading actually present with the timer reading stored on the corresponding register. By this procedure, the determination of the speed of the wheel is very rapid.

Figure 3:
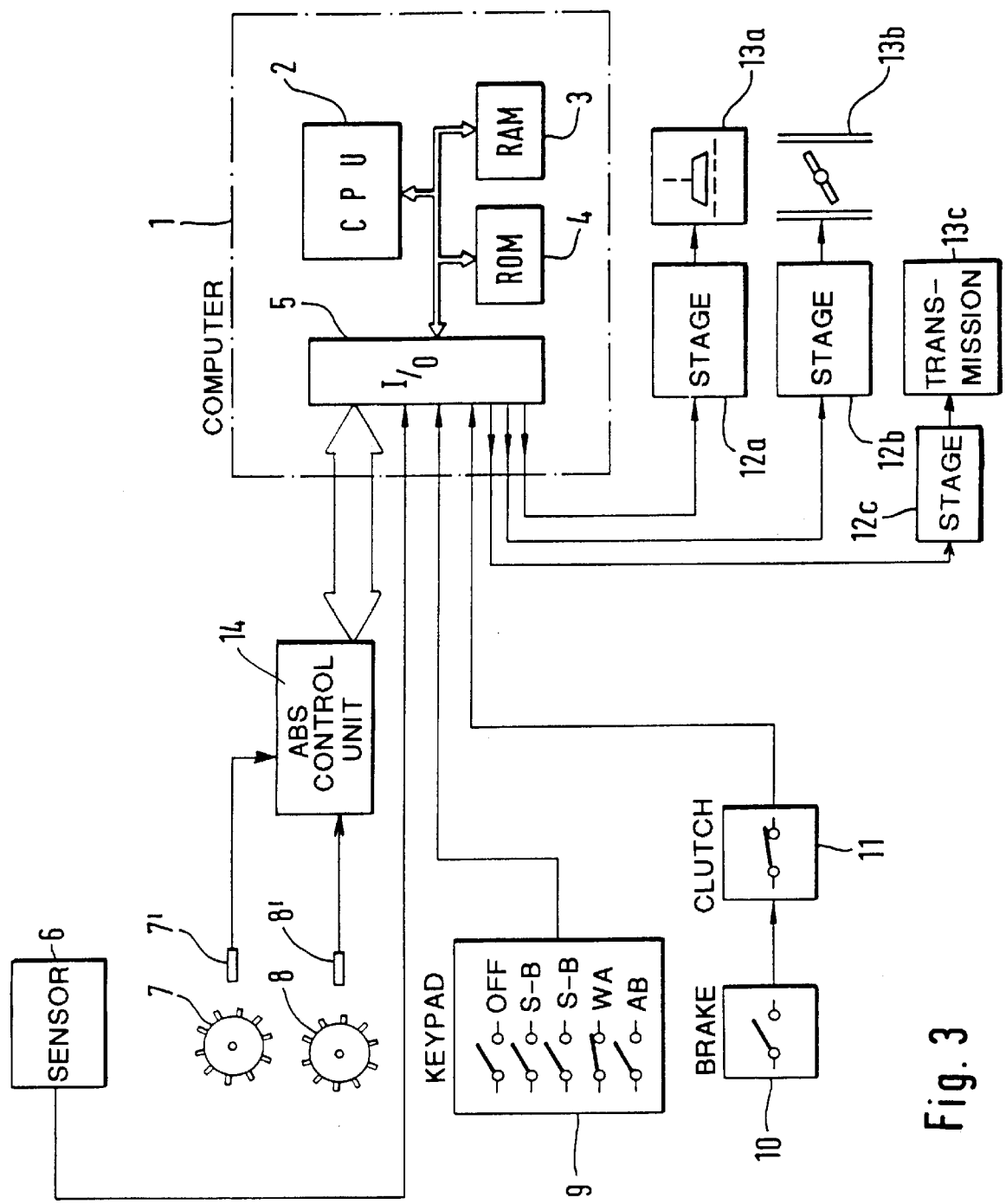
FIG. 3 shows a second embodiment for the determination of the travel corridor.

In another embodiment (FIG. 3), the wheel speed is detected by means of the speed sensors already present in the motor vehicle and is determined in accordance with the method described in an ABS control unit 14, which is also present in the vehicle.

The ABS control unit 14 has in this connection the same construction as the microprocessor 1, which is not further shown. The control unit 14 transmits the wheel speeds determined over a bus system, for instance a CAN bus, to the microcomputer 1, which determines the travel corridor from these data.

Since the speed of the two front wheels is determined independently, travel around curves or the change of a track can be precisely determined upon the calculation in advance of the travel corridor. The precision of the prediction can, however, be further improved if the wheel speed is determined for all four wheels of the motor vehicle.

We claim:

1. A method for the determination in advance of a travel corridor of a motor vehicle, the vehicle having an automatic system for adjusting and controlling a safe tailing distance, the system being operative with a signal corresponding to speed of the vehicle to determine a turning radius of the motor vehicle, the method comprising steps of:

determining the travel corridor from the turning radius;

measuring wheel speeds of at least two vehicle wheels;

determining a yawing of the vehicle from a difference between the speeds of the two wheels; and wherein, for each of said vehicle wheels, said measuring step includes, during rotation of the vehicle wheel, observing time elapsed between succession detections of each of multiple discontinuities present on the circumference of the vehicle wheel to obtain speed of the wheel.

2. A method according to claim 1, wherein the speeds of two vehicle wheels on a common axle are measured.

3. A method according to claim 1, wherein in said observing step, upon detection of each discontinuity on the circumference of the vehicle wheel, there are further steps of producing and counting electric pulses, and determining a period of time within which the pulses of all discontinuities of the wheel are counted precisely once.

4. A method according to claim 3, further comprising steps of dividing the pulses representing the discontinuity into groups and, upon the occurrence of the first pulse of each group, commencing a new time measurement by counting the pulses over all discontinuities.

5. A method according to claim 4, further comprising a step of combining the pulses representing the discontinuities in groups of the same number.

6. A method according to claim 4, wherein, after the occurrence of the pulse of the first discontinuity of each group, there is a further step of storing time information, and, after a repeated occurrence of the pulse of this first discontinuity of each groups there is a step of determining a second time information and a comparing of the second time information with the first time information, and wherein in said step of measuring wheel speeds, said measuring step employs a difference between the two time informations in order to determine the wheel speed of one of the vehicle wheels.

7. A method according to claim 6, wherein, upon the occurrence of the second time information, there are steps of erasing the first time information and storing the second time information.

8. A system for the determination in advance of a travel corridor of a motor vehicle, the vehicle having an automatic system for adjusting and controlling a safe tailing distance, the system being operative with a signal corresponding to speed of the vehicle to determine a turning radius of the motor vehicle, the system being operative to:

determine the travel corridor from the turning radius;

measure wheel speeds of at least two vehicle wheels; and determine a yawing of the vehicle from a difference between the speeds of the two wheels;

wherein the system comprises a sensor and an increment transmitter associated with a least every two wheels of the motor vehicle for detecting signals corresponding to the speeds of the wheels;

a control unit connecting with the sensor, the control unit determining the travel corridor for a predetermined period of time of travel of the motor vehicle; and wherein the control unit has a memory with several registers, the memory being controlled by a signal from a counter.

9. A system according to claim 8, further comprising additional increment transmitters and additional sensors located such that, on each wheel, there is arranged one of said increment transmitters opposite which there is arranged, respectively, one of said sensors, each of said sensors being connected to the control unit; and wherein the control unit determines the vehicle corridor for a predetermined period of time from all signals of all the sensors.

10. A system according to claim 9, wherein all of the sensors are ABS sensors, the sensors being located in the vehicle.

11. A system according to claim 8, wherein all of the sensors are Hall sensors.

12. A system according to claim 11, wherein all of the sensors are ABS sensors, the sensors being present in the vehicle.

* * * * *